United States Patent [19]

Heinrich

[11] Patent Number: 5,447,036
[45] Date of Patent: Sep. 5, 1995

[54] ROTARY MACHINE AND METHOD FOR MAKING HARDENED CONFECTIONS OF COMPLEMENTARY PARTS

[75] Inventor: David B. Heinrich, Columbus, Ohio

[73] Assignee: Nestec, Ltd., Vevey, Switzerland

[21] Appl. No.: 226,494

[22] Filed: Apr. 12, 1994

Related U.S. Application Data

[63] Continuation-in-part of Ser. No. 206,388, Mar. 4, 1994.

[51] Int. Cl.[6] .............................................. A23G 9/10
[52] U.S. Cl. .......................................... 62/75; 62/345; 425/126.2; 425/259; 426/101; 426/134; 426/249
[58] Field of Search ............... 62/345, 75; 425/126.2, 425/134, 259, 261; 426/100, 101, 134, 249, 515, 524

[56] References Cited

U.S. PATENT DOCUMENTS

| | | | |
|---|---|---|---|
| 4,546,615 | 10/1985 | Gram | 62/345 X |
| 4,611,468 | 9/1986 | Degn | 62/345 X |
| 4,986,080 | 1/1991 | Grigoli et al. | 62/345 X |
| 5,343,710 | 9/1994 | Cathenaut et al. | 62/345 X |
| 5,359,858 | 11/1994 | Miller et al. | 62/345 X |

OTHER PUBLICATIONS

Gram, product brochure,"—leading the world in refrigeration", 93 08 6.000 GB.
Gram, product brochure, Ice Cream, Automatic Rotary Novelty Freezers, RIA. 7.46.60 2000 GB 11.89.
Alfa-Laval/Hoyer, product brochure, Ice Cream Equipment, No. SY 80040 E, Reg. OGA1 91.05 5.000.

Primary Examiner—William E. Tapolcai
Attorney, Agent, or Firm—Porter, Wright, Morris & Arthur

[57] ABSTRACT

A rotary machine and method for making unit confections of complementary parts which consist of different recipes, flavors, colors, textures and/or mix inclusions having paired groups of complementary molds arranged radially, adjacent to each other in or on sectors of a rotating table, in which a group of first molds radially arranged in a first sector produces physical shapes which fit within and complementarily join all or part of the physical shapes produced in a group of second molds radially arranged in a second sector.

34 Claims, 4 Drawing Sheets

ROTARY MACHINE AND METHOD FOR MAKING HARDENED CONFECTIONS OF COMPLEMENTARY PARTS

RELATED APPLICATION

This is a continuation-in-part of my co-pending application Ser. No. 08/206,388, filed on Mar. 4, 1994.

FIELD OF THE INVENTION

This invention relates to a machine and method for making hardened confections of physically joined complementary parts which consist of different recipes, flavors, colors, textures and/or mix inclusions. The parts have complementary shapes which are joined in a resulting confection unit. The confection units are frozen or hardened confections or ices which may be flavored ice, ice cream, frozen yogurt, sherbert, sorbet and the like, known in the industry generically as "frozen confections," "hardened confections" or "ices."

More particularly, the invention includes a rotary machine having paired groups of complementary molds. A group of first molds produces first physical shapes which complementarily join with all or part of second physical shapes produced in a group of second molds into which the molded first physical shapes are introduced. The resulting confections can each have two or more complementary constituents that may be further differentiated by recipe, flavor, color, texture and/or mix inclusions. The complementary constituents may be visually as well as gustatorily distinct in the confection unit.

BACKGROUND OF THE INVENTION

Chain-conveyor parallel row machines having parallel rows of molds and rotary table machines having groups of molds for making ice confections are known in the art. A chain-conveyor parallel row machine has molds arranged in parallel rows which are caused to linearly advance through a freezing tank by means of a conveying chain. An example of such a machine is shown in U.S. Pat. No. 4,759,197. A rotary table molding machine having concentric groups of molds for making ice confections uses concentric groups of molds in annular sections which are caused to rotatably advance through a freezing tank by means of a circular mold table.

These known types of machines permit certain types of diversified products to be obtained during a work cycle. Multiple-flavored ice confections can be produced as layers of different flavored ices which are obtained by filling molds in successive steps with different products, as the molds advance in a production cycle. Such machines are also capable of producing "shell and core" confections in which the "core" is removed by suction before it solidifies but after the "shell" solidifies. Another product is then introduced into the resulting space within the shell.

U.S. Pat. No. 4,986,080 ("the '080 patent") discloses a chain-conveyor parallel row machine having parallel rows of molds and a method of producing double-flavor ices. The '080 patent is a particular adaptation of the machine disclosed in U.S. Pat. No. 4,759,197. The '080 patent discloses a machine in which parallel rows of molds are intermittently advanced through a freezing section by means of a conveying chain. The parallel rows of molds differ in shape, one row to the next, such that the cross-sections of molds of some rows are stated to be "inscribable" into the cross-sections of molds in other rows. The '080 patent includes metering-filling units, a stick-inserting unit and withdrawing devices such as are known in the art.

In general, chain-conveyor parallel row machines have certain operational disadvantages. These include: inefficient mold utilization, resulting from fewer than 50% of all molds being in use at any time; inefficient floor plan utilization, resulting from the complete machine having a significant length; poor repeatability of mold positioning, resulting from variations in conveyor chain pitch dimensions due to wear; and incomplete sealing of the mold area from the freezing area, resulting from jointed, articulated construction inherent in a chain conveyor.

Rotary machines resolve several of these difficulties. Molds are located in a circular unitized mold table that effectively seals the product from the mold chilling brine, which is a hygienic advantage. The chain-conveyor parallel row machines carry molds in a jointed, articulating conveyor that is difficult to seal in order to avoid product contamination by the mold chilling brine. Also, unlike the rotary table machine, the chain-conveyor parallel row machine requires that molds be returned to the "start" position by passing molds upside down under the machine typically through an energy and water consuming washing system. The manner of returning molds to the start position results in a mold utilization factor of less than 50% whereas a mold utilization factor for rotary table machines can be higher than 75%. Mold utilization factor is important because molds are expensive.

An example of a rotary machine and method for making hardened confections having complementary parts joined in a unit is fully described in my co-pending application for U.S. patent Ser. No. 08/206,388, having the common assignee of the present invention and incorporated herein by reference for all purposes.

SUMMARY OF THE INVENTION

A machine and method is provided for making unitized confections of complementary parts in an efficient manner that overcomes problems of the chain-conveyor parallel row machines and achieves the advantages incident to rotary design. In particular, the invention uses at least two groups of complementary molds arranged radially in sectors of a rotating table. The first mold group produces physical shapes which complementarily join with all or part of the shapes produced in the second mold group. The shapes produced by the first mold group are introduced into the molds of the second group and a unitized confection of two parts results. The first and second mold groups are aligned as a paired group essentially radially with respect to the rotating table. This confection may consist of complementary parts of different recipes, flavors, colors, textures and/or mix inclusions; and the complementary parts may be visually and/or gustatorily distinct in the confection unit.

This invention includes at least one solidifying (.i.e., hardening or freezing) section through which each of the paired groups of complementary molds are advanced by rotation. The molds may be advanced in a unitized table configuration by a drive mechanism for rotatably advancing the paired groups of molds about an axis. The molds of the respective groups determine the complementary shapes that form the finished confection unit. A first filling unit is provided to introduce a first product into the first molds. Sticks are inserted into the product in the first molds. After the product in the first molds solidifies, a withdrawing mechanism withdraws the solidified product from the first molds, waits until the second molds pass under the withdrawing mechanism, and introduces the solidified product into the adjacent second molds of the paired group. In another embodiment, a withdrawing mechanism withdraws the solidified product from the first molds and transfers the molded product either in an advancing or retarding motion with respect to the motion of the table to the second molds of the pair. The molded product from the first molds is sized such that it fits within the second molds.

A second filling unit is provided to introduce a second product differing from the first product into spaces existing between the inner wall of the second molds and the surface of the molded product from the first molds contained therein. This second product then solidifies as the second molds are advanced by rotation through the solidifying section. A withdrawing mechanism then withdraws the resulting solidified multiple-product confection units from the second molds and transfers the confection for further processing, such as coating if desired, and wrapping and packaging.

In the method of the invention, paired molds are provided within sectors of a unitized rotating table and aligned essentially radially with respect to the rotating table. In the pair, the second group of molds is complementary in shape with the first group of molds and receives therein the molded product from the first molds. The molds are advanced by rotation through a solidifying section. The group of first molds is filled with a first product; sticks are inserted into the filled first molds. When hard, the molded products, with the stick inserted, are withdrawn from the first molds and introduced into the corresponding group of second molds in the pair. Then spaces existing between the inner wall of the second molds and the outer surface of the first molded products are filled with a second given product. When solidified, the resulting confection units are withdrawn from the second molds.

The invention may also include a unitized table to rotatably advance the paired groups of complementary molds in the course of a production cycle. The first and second filling units which introduce product into the molds may also fill the respective molds with a quantity of respective products during a predetermined period of time (a "time fill"), according to a predetermined volumetric measure (a "volumetric fill") or by a predetermined weight measure (a "weight fill"). The complementary parts of the resulting confections may consist of different recipes, flavors, colors, textures and/or mix inclusions.

The resulting product is a confection unit of distinct complementary parts consisting of multiple recipes, flavors, colors, textures and/or mix inclusions, wherein separate physical shapes complementarily join with all or part of other physical shapes.

The foregoing and other objects and advantages of the present invention will become more apparent when viewed in light of the accompanying drawings and the following description.

DESCRIPTION OF THE PREFERRED EMBODIMENT

Figure 1:
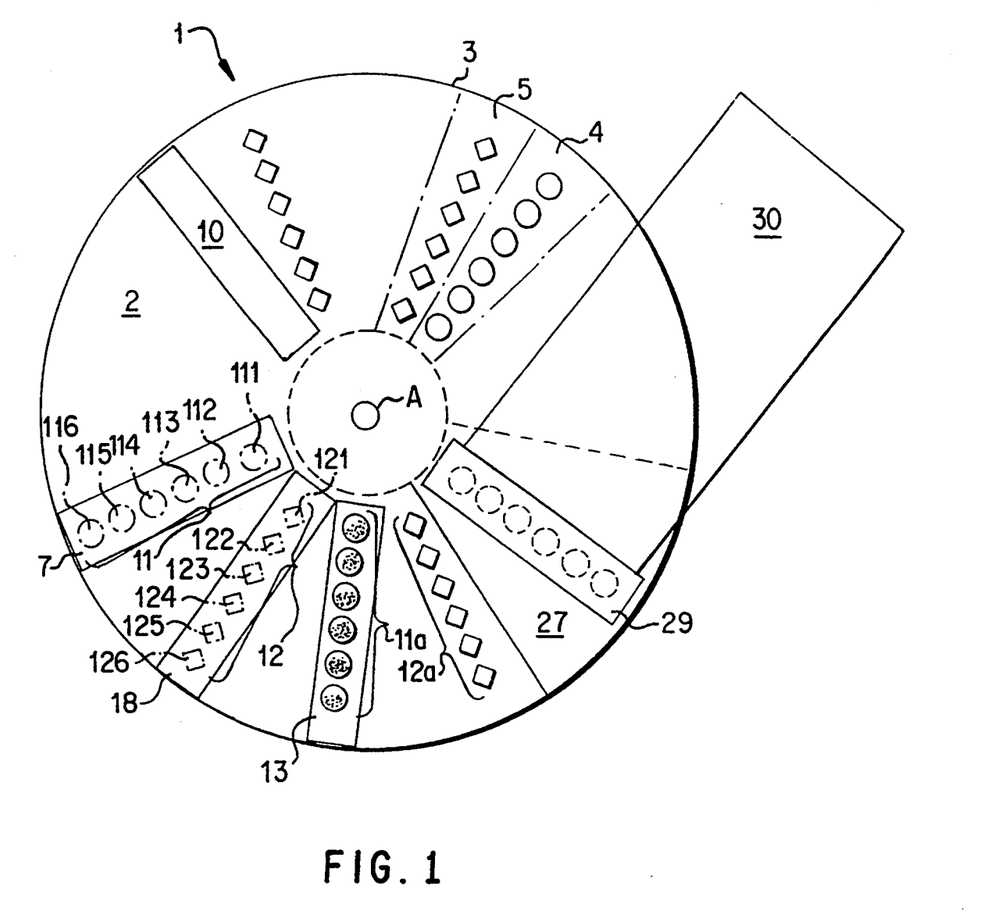
FIG. 1 shows a plan view of the machine for making confection units of complementary parts in accordance with the present invention.
Figure 2:
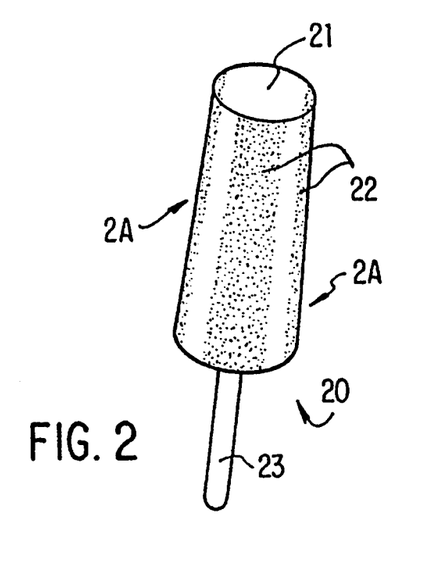
FIG. 2 shows an example of a confection unit produced by the method and machine herein.
Figure 2A:
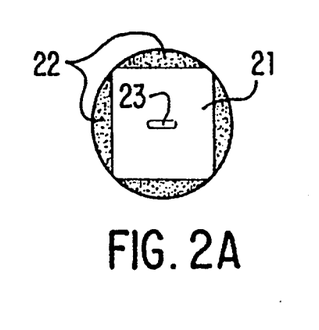
FIG. 2A is a cross-sectional view of the confection unit taken along line 2A—2A of FIG. 2 showing the shapes of the different parts.
Figure 2B:
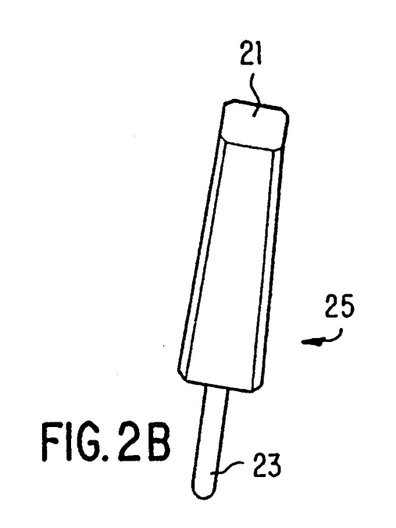
FIG. 2B shows an example of the solidified intermediate product from the first molds produced by the method and machine herein.

Referring now to the drawings, FIG. 1 illustrates an embodiment of the machine 1 of the present invention for making confection units of complementary parts. FIGS. 2 and 2A show the unit confection 20 produced by the invention having an inner core 21 formed by a single mold in a first group of molds in the machine 1 and a complementary second shape 22 formed by a single mold in a second group of molds in the machine 1. A stick inserted into the confection unit is shown as 23. The stick 23 may be flat, round, or other functional or decorative shape and is formed from wood, polymer, paper or other material as is known in the art. FIG. 2B shows an example 25 of the intermediate product, or inner core, 21 with a stick 23 after the product has been removed from a single mold in a first group of molds.

Figure 1A:
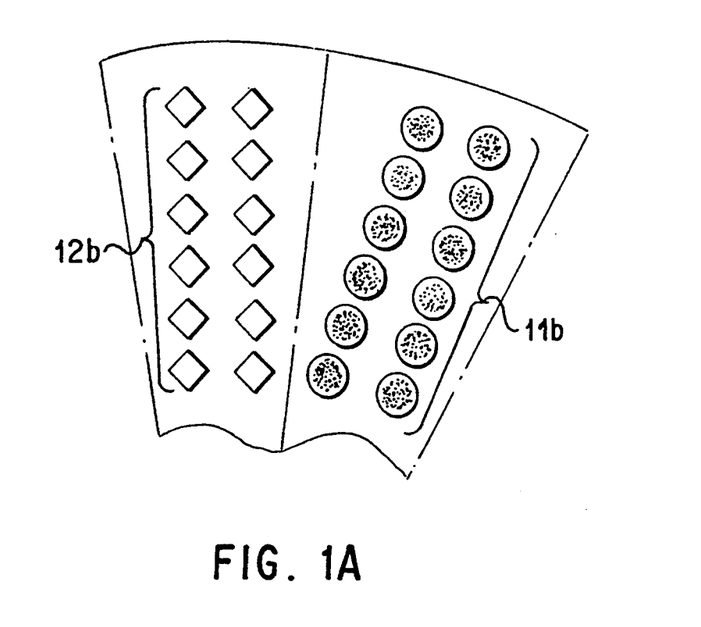
FIG. 1A shows a section of an alternate table configuration having multiple sets of mold groups aligned together essentially radially with respect to the rotating table.

In FIG. 1, the machine 1 is a rotary machine that comprises a solidifying section 2 through which, as located on or in rotating table 3, paired groups 11 and 12, 11a and 12a, etc., of complementary molds are rotatably advanced in an essentially circular path. The table is preferably planar and horizontally oriented. The individual molds in the groups 11 and 12 are respectively indicated as 111, 112, 113, 114, 115 and 116 and 121, 122, 123, 124, 125 and 126. The individual molds in both groups of molds are preferably tapered so as to facilitate withdrawal of molded product therefrom. The mold groups are shown in sectors 4 and 5 of the rotating table 3 and are aligned essentially radially. The mold groups may be in a single line as shown in Figure 1 at 11 and 12 or in adjacent groupings as shown in FIG. 1A. In FIG. 1A, twelve molds in each mold group are respectively shown at 11b and 12b in respective sectors of the table. The solidifying section 2 may be a brine bath, spray system or other mechanism that provides a solidifying or freezing environment, sufficient to harden a confection, such as is known in the art. A sufficient temperature of brine for solidifying product in the molds is typically −45° F. to −50° F.

The molds in the first group 11 differ from the molds in the second group 12 such that a solidified molded product from the individual molds in the first mold group 11 will fit within the individual molds in the second mold group 12. Groups of molds comparable to groups 11 and 12 may be located on or in the rotating table 3. Also, more than two different groups of radially arranged, complementary molds may be used to make confections with more than two different recipes, flavors, colors, textures and/or mix inclusions.

With reference to FIG. 1, the machine 1 includes a rotating table 3 having disposed thereon groups of two different types of molds 11 and 12, which respectively produce intermediate product (25 in FIG. 2B) and finished product (20 in FIG. 2). Point A is the axis of rotation of the horizontal rotating table 3. Each of the groups of molds 11 and 12 are disposed with respect to respective filling units 7 and 18 and, after the molds are filled with product, the filled molds pass through a solidifying section 2. During this passage, the product in the molds hardens. Intermediate in the rotational cycle for the groups of molds 11 is a stick inserter 10. The groups of molds 11 and 12 complete a rotational cycle after passing through a warming section 27 which "loosens" solidified product from the molds so it can be removed.

In a preferred embodiment, the paired groups of molds are disposed on a circular, flat, horizontal rotating table 3. A first filling unit 7, for filling the first molds 11, is operationally disposed at or proximate to a beginning position of a one rotation cycle for the first molds. The first filling unit 7 introduces a flowable product into the first molds when the first molds are positioned under the first filling unit 7. Arctuately disposed with regard to the first filling unit 7, there is a stick-inserting unit 110 designed to insert sticks 23 into the product in the first molds while the product is solidifying during the rotational cycle.

The product in the first molds is solidified by the time the molds reach the warming section 27, which is located before the end of the rotational cycle of the first molds. The warming section 27 "loosens" the solidified product in the first molds so the product can be removed by the withdrawing mechanism 13, which is located after the warming section 27 in the rotation path and at approximately the beginning of the rotational cycle of the second molds 12. To facilitate withdrawal of the frozen product 25 from the first molds, the outer surfaces of the first molds are subjected to "warming" in a manner known in the art, for example, by the aid of brine, air or other fluid at a given temperature introduced from below the molds. A warming brine spray section, through which the molds are advanced, is positioned in FIG. 1 at 27.

Figure 1B:
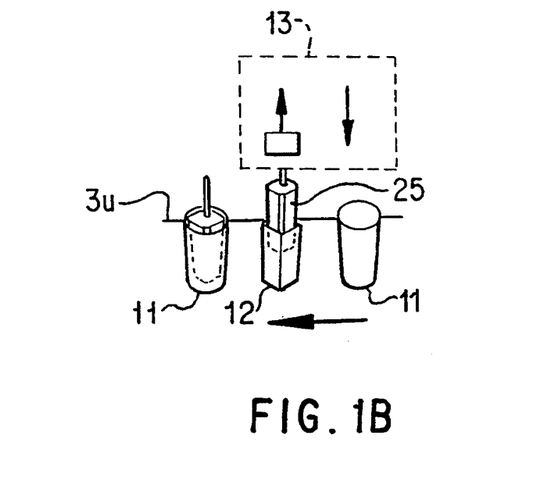
FIG. 1B illustrates the action of the first withdrawal mechanism transferring solidified product of the first molds to the second molds.

At the withdrawing mechanism 13, the product is removed from the first molds 11 and introduced into the second molds 12 which are sized such as to receive therein the frozen product 25 of the first molds. The transfer of first molded products, as a group, from first mold group 11 to second mold group 12 is illustrated in FIG. 1B. The mechanism 13 grasps the inserted sticks 23 and withdraws the product 25 up and out of the first molds 11, waiting until the second molds 12 pass under the withdrawing mechanism 13 due to rotation of the rotating table 3, and introducing the solidified product 25 into the second molds 12 by lowering, dropping or inserting the solidified product 25 into the second molds 12.

In another embodiment, the transfer of first molded products, as a group, from first mold group 11 to second mold group 12 is effected by grasping the inserted sticks 23 and withdrawing the product 25 up and out of the first mold 11, then shifting the product essentially concentrically, either in an advancing or retarding motion, across the upper table surface 3U to a position over the second mold group 12. The product 25 is then lowered, dropped or inserted into the second molds 12. The mechanism is then recycled for the next mold group 11a, etc. In this latter embodiment, if the withdrawal and transfer occurs when rotational movement of the table is stopped, the transfer is essentially concentric. If, however, the transfer occurs as the table rotates, the movement by the transfer mechanism is coordinated with the table rotation such that the transfer operation is conducted according to a reciprocating time and positional sequence in correspondence with the table rotation and angular mold separation.

The molded products from the first molds 11 are sized to fit within the second molds and may or may not contact the inner walls of the second molds 12. Product from the first molds may also have shapes with cross-sections that do not contact the inner side wall of the second molds. In this situation, mechanical supports may be provided by which the molded products from the first molds are held upright in the second molds. This allows the molded product to stand upright in the second molds when a second liquid product from the second filling unit is introduced in the space existing between the inner wall of the second molds and the molded product from the first molds.

After the products from the first molds are withdrawn from the first molds and transferred into the second molds by mechanism 13, the second molds, with the product from the first molds therein, continue to advance through the solidifying or freezing section 2 to a second filling unit 18. When the second molds are positioned beneath the second filling unit 18, the second filling unit 18 introduces a second product into the second molds to fill the spaces existing between the inner wall of the second molds and the molded product transferred from the first molds into the second molds. The second filling unit 18 fills the second molds with a quantity of the second product according to a predetermined time fill, volumetric fill or weight fill. The second product may be a different recipe, flavor, color, texture and/or mix than is introduced by the first filling unit 7.

After the second molds are filled by the second filling unit 18, the filled molds are rotatably advanced through the solidifying section 2 to solidify the introduced second liquid product. To facilitate withdrawal of the resulting solidified multi-part confections from the second molds, the second molds are "warmed" in a manner as noted above, for example, by the aid of a spray or bath of brine or other fluid directed from below the molds in the warming section 27 through which the second molds are advanced. In another embodiment, a second warming section, independent of warming section 27, may be used to warm the second molds. Then a withdrawing mechanism 29 withdraws the confections 20 from the second molds. Withdrawing mechanism 29 essentially corresponds in structure and operation to either intermittent or continuous operation of unit 13 as described above. The confections 20 are transported to a conventional wrapping and packaging station in a manner known in the art, such as with a chute or conveyor 30.

After the product is removed from the first molds, the first molds do not remain empty until the corresponding confection of complementary parts is withdrawn from the second molds at the end of another rotational cycle. Instead, the first molds are promptly refilled by the first filling unit 7 and the process continues as stated above for the first molds while the second molds with first molded product therein are being filled, solidified and removed during the rotational cycle. Thus the paired groups of molds in the sectors of the rotary machine are used at a high efficiency throughout the rotational cycle. This is an improvement in efficiency over chain-conveyor parallel row machines in which more than one half of the molds remain empty during a product forming cycle. As a consequence, the rotary machine requires fewer molds to process the same capacity of ice confections than chain-conveyor parallel row machines. In addition, the rotary machine continuously performs in a cyclical rotational cycle of the unitized circular table. Time, temperature and specific rotational cycles are determined by the hardening and/or freezing characteristics of the product introduced into the molds and can be determined by those familiar with recipe requirements.

The resulting products from the machine 1 and method as described above and shown in FIGS. 2 and 2A are confections of complementary parts, wherein the complementary parts consist of visually or gustatorily distinct shapes, recipes, flavors, colors, textures and/or mix inclusions. Many different variations of arbitrary shape configurations are obtainable, some of which are shown in the aforementioned '080 patent. By varying the shapes of the first and second molds, and as long as the molded product from the first molds fits within the cross-section of the corresponding second molds, many variously shaped confections of complementary parts can be formed. The confections may also be coated with chocolate and/or other coatings, by spraying or dipping the units into a final bath of a given product, as is known in the art.

Figure 3:
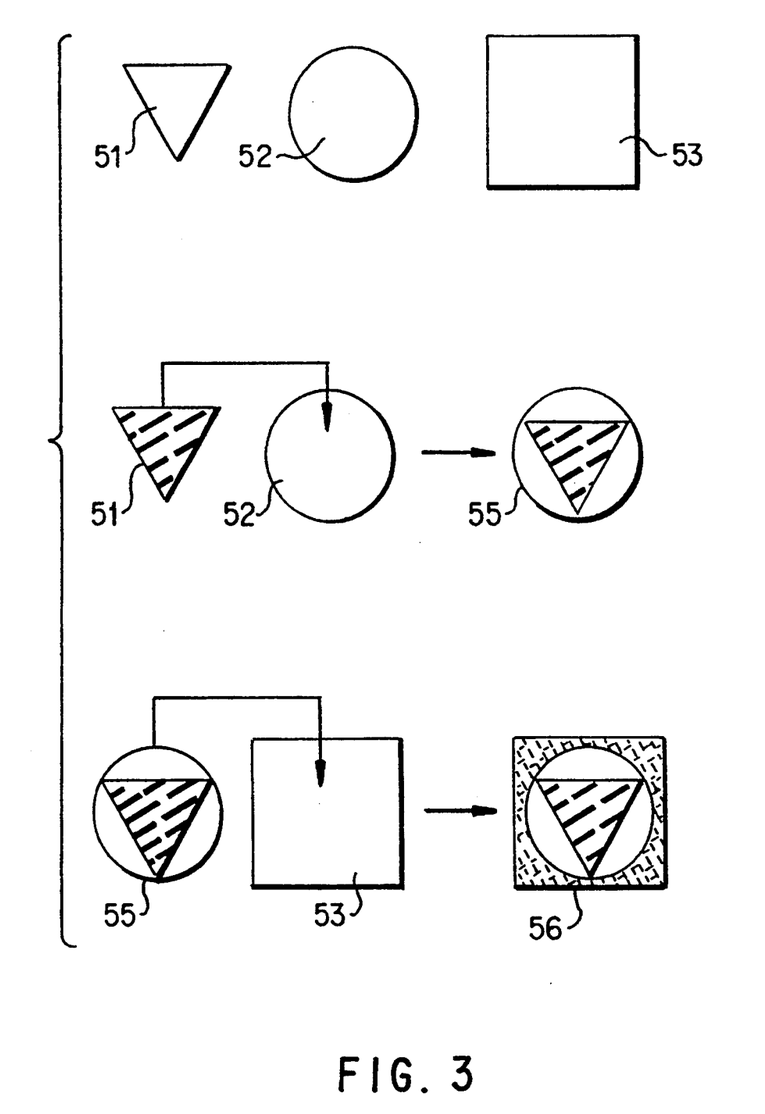
FIG. 3 shows an example of "paired" groups of molds where more than two shapes are provided to make a confection unit.

As used herein, "paired" refers to the respective sequential transfer of a product from a mold to a successive mold. A "pair" is not limited to two shapes in the production of a finished product. FIG. 3 shows, in cross-section, an example in which three different shapes 51, 52 and 53 are used to form a resulting three-product confection 56. The finished product 56 is formed from a first paired product 55, which is itself a formed product of two shapes, inserted into a third shaped mold 53. Mold 53 is "paired" with the first paired shape 55, which is formed from paired molds 51 and 52.

The example shown in FIG. 3 may involve red, white and blue colors, or chocolate, vanilla and strawberry flavors, corresponding to respective shapes 51, 52 and 53. In this scenario, the first paired product 55 consists of a circular product 52 molded in a second mold group around a triangular shaped product 51 formed in a first mold group. The first paired product 55 (from the first mold group of the second "pair") is inserted into a third shaped mold 56 (the second mold group of the second "pair") to form a finished product consisting of, in cross-section, a square surrounding a circle surrounding a triangle.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A machine for making hardened confections of complementary parts, comprising:

at least two groups of complementary molds provided as a paired group, said paired group including a group of first molds for producing a solidified physical shape which fits within the molds in a group of second molds;

at least one solidifying section through which said paired groups of first and second molds are each advanced by rotation;

a first filling unit for introducing a first product into said first molds;

a stick inserter for inserting a stick into the product molded in the first molds;

a first withdrawing mechanism for withdrawing solidified product from said first molds and for introducing said withdrawn product into said second molds;

a second filling unit for introducing a second product into said second molds to fill the spaces in the second molds not occupied by the first molded products contained therein; and a second withdrawing mechanism for withdrawing the confections from said second molds after the second product solidifies.

2. The machine of claim 1 further comprising a drive mechanism for rotatably advancing the paired groups of molds in a path about an axis.

3. The machine of claim 1 in which the paired groups of molds are provided in a sector of a circular table.

4. The machine of claim 1 further comprising a unitized planar table that is horizontally disposed for rotatably advancing said paired groups of molds about a central axis.

5. The machine of claim 1 wherein said first filling unit is operationally disposed at or proximate to a beginning position of a one rotation cycle of said first molds.

6. The machine of claim 1 wherein said first filling unit fills said first molds with a quantity of the first product according to at least one means from the group consisting of a predetermined period of time, a predetermined volumetric measure and a predetermined weight measure.

7. The machine of claim 1 wherein said second filling unit fills said second molds with a quantity of the second product according to at least one means from the group consisting of a predetermined period of time, a predetermined volumetric measure and a predetermined weight measure.

8. The machine of claim 1 wherein said stick-inserting unit is located above the advancement path of said first molds and is positioned with respect to the rotation path of the molds such that sticks are introduced therein before the first product solidifies.

9. The machine of claim 1 in which said first withdrawing mechanism includes a first mechanism for withdrawing solidified product from the first molds and a second mechanism for transferring the withdrawn product into the second molds.

10. The machine of claim 1 wherein said first withdrawing mechanism is located before the end of the rotation path of said first molds and at approximately the beginning of the rotation path of said second molds.

11. The machine of claim 1 in which said first withdrawing mechanism includes means for grasping the sticks inserted into the product in the first molds, lifting the product from the first molds, and introducing the product into the second molds when the second molds are located below said first withdrawing mechanism.

12. The machine of claim 1 in which said first withdrawing mechanism includes means for grasping the sticks inserted into the product in the first molds, lifting the product from the first molds, conveying the product to a location above the second molds and depositing the product therein.

13. The machine of claim 1 wherein said second withdrawing mechanism is located before the end of the rotation path of said second molds.

14. The machine of claim 12 in which before the molded products withdrawn from said first molds are deposited into said second molds, said molded products are caused to move in an advancing motion with respect to rotational movement of the molds.

15. The machine of claim 12 in which before the molded products withdrawn from said first molds are deposited into said second molds, said molded products are caused to move in a retarding motion with respect to rotational movement of the molds.

16. The machine of claim 1 in which said second filling unit introduces a product differing from the first product introduced by the first filling unit.

17. The machine of claim 16 in which said second filling unit introduces a product differing in at least one way from the group consisting of flavor, color, texture and mix inclusions from the first product.

18. The machine of claim 1 further including a warming section located proximate to the end of the rotation path of said first molds.

19. The machine of claim 1 further including a warming section located proximate to the end of the rotation path of said second molds.

20. The machine of claim 1 further including a warming section located proximate to the end of the rotation path of each of said first and second molds.

21. The machine of claim 18 wherein said warming section comprises at least one of the group consisting of fluid bath and a fluid spray.

22. The machine of claim 19 wherein said warming section comprises at least one of the group consisting of a fluid bath and a fluid spray.

23. The machine of claim 20 wherein said warming section comprises at least one of the group consisting of a fluid bath and a fluid spray.

24. A machine for making hardened confections of complementary parts, comprising:
a unitized table that is horizontally disposed and operatively connected to a drive mechanism for rotatably advancing said paired groups of molds about a central axis;
at least two groups of complementary molds provided as a paired group within a sector of said unitized table, said paired group including a group of first molds for producing a physical shape which complementarily joins with all or part of the physical shape produced by molds in a group of second molds within which the shapes produced by the first molds fit, said first and second groups of molds being further arranged radially with respect to a central axis of said table;
a drive mechanism for rotating the unitized table;
at least one solidifying section through which said paired groups of first and second molds are each advanced by rotation;
a first filling unit for introducing a first product into said first molds, said first filling unit being operationally disposed at or proximate to a position defining a beginning of one rotation cycle;
a stick-inserting unit located above the advancement path of said first molds and positioned with respect to the rotational path of said first molds such that sticks are introduced therein during the hardening of the first product;
a first withdrawing mechanism for withdrawing solidified product from said first molds and for introducing said withdrawn molded product into said second molds;
a second filling unit for introducing a second product differing from the first product into the second molds to fill the space therein not occupied by the first molded product contained therein; and
a second withdrawing mechanism for withdrawing product from said second molds after the second product solidifies.

25. The machine of claim 24 in which said first withdrawing mechanism includes a first mechanism for withdrawing solidified product from the first molds and a second mechanism for transferring the withdrawn product into the second molds.

26. A rotary machine for making unit confections of complementary parts which consist of different recipes, flavors, colors, textures and/or mix inclusions comprising paired groups of complementary molds arranged radially, adjacent to each other in or on sectors of a rotating table, in which a group of first molds radially arranged in a first sector produces physical shapes which fit within and complementarily join all or part of the physical shapes produced in a group of second molds radially arranged in a second sector.

27. A method of making hardened confections of complementary parts, comprising the steps of:
providing a first group of molds within a first sector of a unitized table;
providing a second group of molds complementary in shape with the first molds, within which product molded in the first group of molds fits, within a second sector of a unitized table, said first and second groups of molds being a paired group;
causing said first and second groups of molds to each advance by rotation through an environment in which product introduced into the molds is solidified;
filling the first group of molds with a first product;
withdrawing solidified product from said first molds and introducing said product into said second molds;
filling the second group of molds with a second product to fill the volume of the second mold that is not occupied by the transferred solidified product from the first mold; and
withdrawing the molded product from said second molds when the molded product is solidified.

28. The method of claim 27 wherein the advance by rotation of the paired group of molds is continuous.

29. The method of claim 27 wherein the advance by rotation of the paired group of molds is intermittent.

30. The method of claim 27 further comprising the step of filling said first molds with a quantity of the first product by at least one means from the group consisting of a predetermined period of time, a predetermined volumetric measure and a predetermined weight measure.

31. The method of claim 27 further including the step of inserting a stick into the product in the first molds.

32. The method of claim 27 further including the step of warming the molds before the solidified product therein is withdrawn.

33. The method of claim 31 wherein the step of withdrawing solidified product from said first molds and introducing said product into said second molds comprises grasping the sticks inserted into the product in the first molds, lifting the product from the first molds, and introducing the product into the second molds when the second molds are located below said first withdrawing mechanism.

34. The method of claim 31 wherein the step of withdrawing solidified product from said first molds and introducing said product into said second molds comprises grasping the sticks inserted into the product in the first molds, lifting the product from the first molds, conveying the product to a location above the second molds and depositing the product therein.

* * * * *